United States Patent [19]

Minamibata

[11] Patent Number: 5,271,476
[45] Date of Patent: Dec. 21, 1993

[54] RACK BUSHING FOR RACK AND PINION STEERING SYSTEM

[75] Inventor: Yukimitsu Minamibata, Saitama, Japan

[73] Assignee: Jidosha Kiki Co., Ltd., Tokyo, Japan

[21] Appl. No.: 16,711

[22] Filed: Feb. 11, 1993

[30] Foreign Application Priority Data

Feb. 26, 1992 [JP] Japan .................. 18028[U]

[51] Int. Cl.$^5$ .................................. B62D 5/06
[52] U.S. Cl. ............................ 180/148; 180/154; 92/169.1; 384/296
[58] Field of Search .............. 180/132, 146, 147, 148, 180/151, 154, 155, 158, 162; 92/169.1; 384/26, 29, 42, 296, 16; 74/89.17, 388 PS, 422, 498

[56] References Cited

U.S. PATENT DOCUMENTS

| | | | |
|---|---|---|---|
| 4,369,852 | 1/1983 | Nishikawa et al. | 180/148 |
| 4,913,562 | 4/1990 | Rosen | 384/296 X |
| 4,917,509 | 4/1990 | Takano | 384/296 X |

*Primary Examiner*—Margaret A. Focarino
*Assistant Examiner*—Victor E. Johnson
*Attorney, Agent, or Firm*—Flynn, Thiel, Boutell & Tanis

[57] ABSTRACT

The durability of a rack bushing which supports of a rack shaft of a rack and pinion steering system is improved. A bushing holder 18 is fixedly mounted in one end of a steering body 6, and a rack bushing 2 is held within the bushing holder in order to support a rack shaft 4 in a slidable manner. An end of the rack bushing is formed with a locking flange 2b, which fits in an annular groove 18a formed in the bushing holder. Adjacent to the end where the flange is formed, the inner peripheral surface of the rack bushing is formed with a portion of an increased diameter 2c which avoids its contact with the rack shaft. The portion of an increased diameter extends inward beyond the region of the annular groove and a chamfer 18c formed on sidewall of such groove of the bushing holder.

3 Claims, 2 Drawing Sheets

RACK BUSHING FOR RACK AND PINION STEERING SYSTEM

BACKGROUND OF THE INVENTION

The invention relates to a rack and pinion steering system, and in particular, to a rack bushing which slidably supports a rack shaft within a steering body.

A conventional rack and pinion steering system is illustrated in FIG. 5 where a substantially cylindrical rack bushing 102 is disposed around the inner surface of a bushing holder 100 which is secured to a steering body, not shown, for slidably supporting a rack shaft 104. The inner peripheral surface of the bushing holder 100 is formed with an annular groove 100a while one end of the rack bushing 102 is formed with an outwardly extending flange 102a, which fits in the annular groove 100a in the bushing holder 100 to lock it against withdrawal. A clearance 106 is defined between the outer peripheral surface of the flange 102a of the rack bushing 102 and the bottom surface of the annular groove 100a in the bushing holder 100.

In the rack and pinion steering system constructed in the manner mentioned above, a load in the form of an impact which is directed oblique or perpendicular to the axis of the rack shaft 104 may be transmitted through a tie rod when steering upon a bad road. Such load acts upon the inner surface of the rack bushing 102 in the region of the end 102b around its inner periphery where the flange 102a is formed, tending to urge such end 102b outward. As a consequence, the outer peripheral surface of the rack bushing 102 is subject to a surface pressure of an increased magnitude from an upper edge 100c of a chamfer 100b formed on the sidewall of the annular groove 100a formed in the bushing holder 100, causing the likelihood that the durability of the rack bushing 102 may be endangered by being cracked.

SUMMARY OF THE INVENTION

Accordingly, it is an object of the invention to provide a rack bushing of an improved durability which is free from the likelihood of being damaged in the event an impact load is applied to a rack shaft.

Such object is accomplished in accordance with the invention by providing a rack bushing, which is held within a bushing holder to support a rack shaft slidably, with a flange on its external surface, which is fitted in an annular groove formed in the inner peripheral surface of the bushing holder to lock it against withdrawal while the inner peripheral surface of the rack bushing is formed with a portion of an increased diameter which is maintained free from contact with the rack shaft.

Other objects and advantages of the invention will become apparent from the following description of an embodiment thereof with reference to the attached drawings.

DESCRIPTION OF EMBODIMENT

Figure 2:
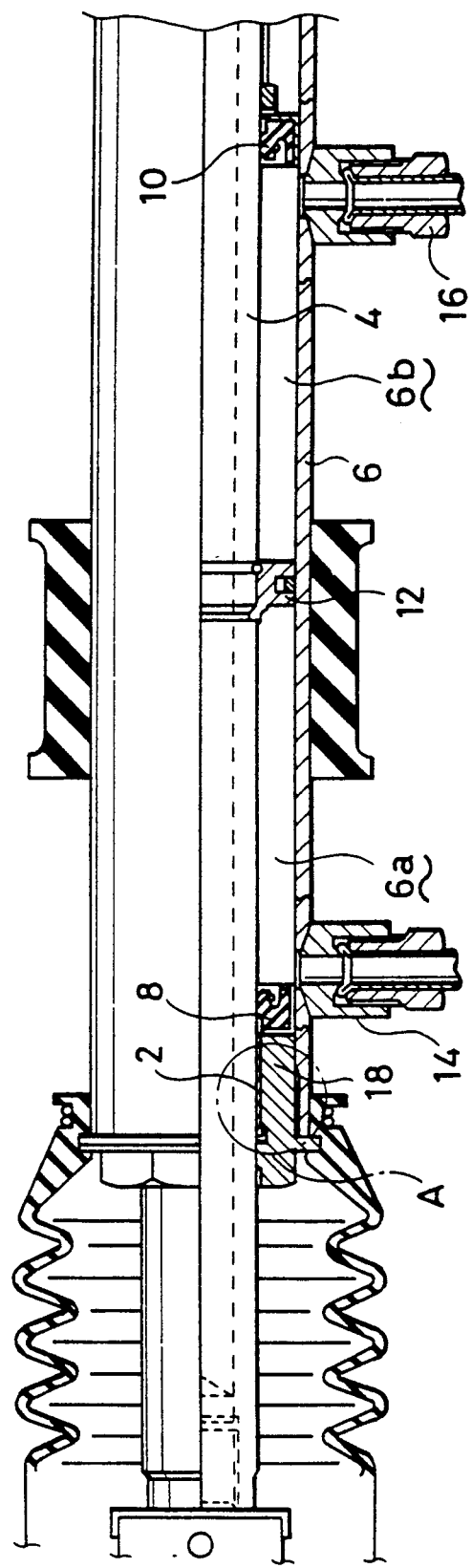
FIG. 2 is a longitudinal section of a rack and pinion steering system including the rack bushing according to one embodiment of the invention.

Referring to the drawings, an embodiment of the invention will now be described. Referring to FIG. 2, a rack shaft 4 is connected to a steerable wheel through a tie rod, not shown. The rack shaft 4 is slidably supported within a steering body 6 by means of a rack bushing 2 to be described later. At its opposite ends, the steering body 6 is fitted with seal members 8, 10 into the internal surface thereof, and the interior of the steering body 6 is divided into a pair of pressure chambers 6a, 6b by a piston 12 which is fixedly mounted on the outer surface of the rack shaft 4. Toward its right portion, as viewed in the drawings, the rack shaft 14 is formed with rack teeth, which mesh with a pinion, not shown, which is rotatably supported within a gear housing. As a steering wheel is operated to rotate the pinion, its meshing rack shaft 4 is driven for reciprocating motion to change a control valve, whereby a pressure oil which is discharged from a pump is introduced into one of the pressure chambers 6a, 6b formed in the power cylinder 6 through a cylinder port 14 or 16 while the other chamber communicates with a tank. A pressure differential across the both chambers 6a, 6b acts upon the piston 12 to impart a steering assisting force.

Figure 1:
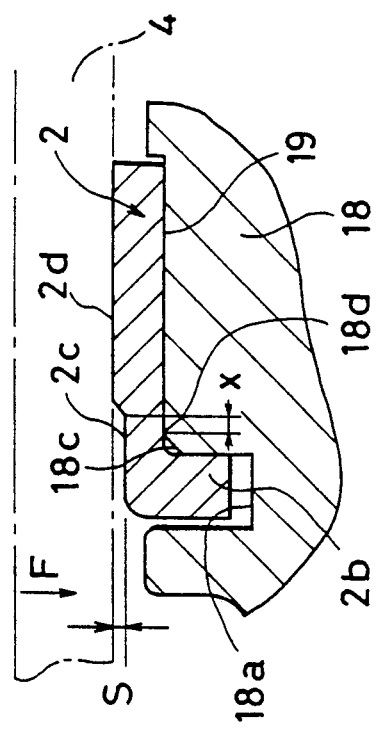
FIG. 1 is a longitudinal section of an essential part of a rack and pinion steering system including a rack bushing constructed in accordance with one embodiment of the invention, and also represents a view, to an enlarged scale, of an encircled region A shown in FIG. 2.

FIG. 1 is a view, to an enlarged scale, of an encircled region A shown in FIG. 2. The rack bushing 2 which slidably supports the rack shaft 4 is held within a bushing holder 18, which is in turn threadably secured within one end of the steering body 6 (see FIG. 2). Around its inner peripheral surface, the bushing holder 18 is formed with an annular groove 18a, and the sidewall of the annular groove 18a which faces inward of the steering body 6 is formed with a chamfer 18c.

Figure 3:
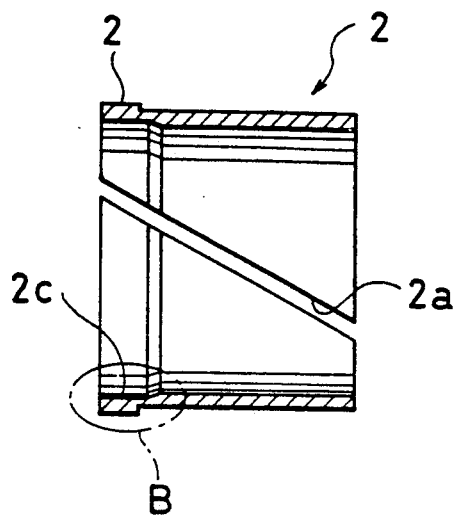
FIG. 3 is a longitudinal section of the rack bushing.
Figure 4:
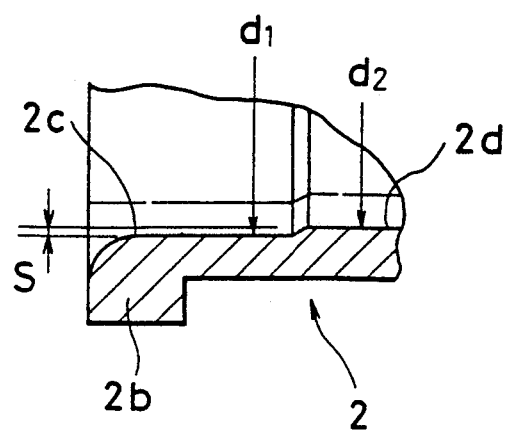
FIG. 4 is a view, to an enlarged scale, of an encircled region B shown in FIG. 3.
Figure 5:
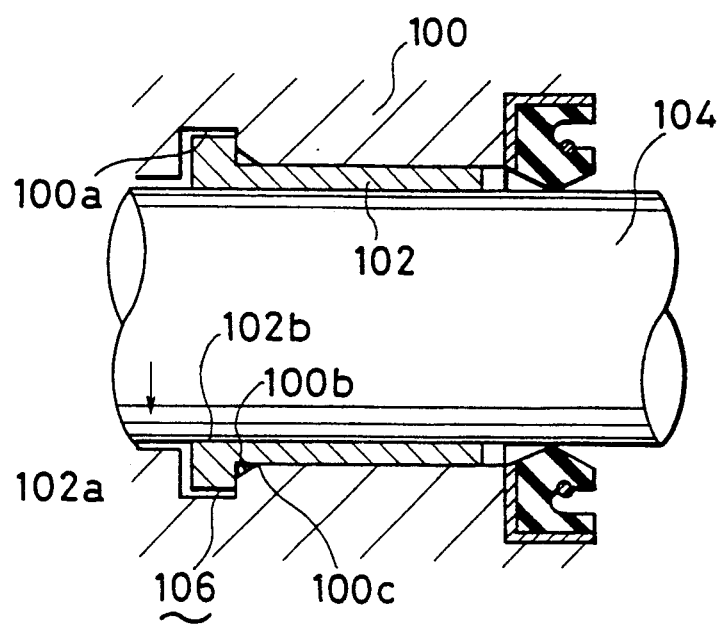
FIG. 5 is a longitudinal section of an essential part of a rack and pinion steering system including a conventional rack bushing.

As shown in FIGS. 3 and 4, the rack bushing 2 is formed as a substantially cylindrical member which may be formed of a material such as a resin and which is formed with an obliquely extending slit 2a. One end of the rack bushing 2 is formed with an outwardly extending flange 2b. At this end of the rack bushing where the flange 2b is formed, the inner peripheral surface of the rack bushing 2 is formed with a relieved portion 2c having an internal diameter $d_1$ greater than the internal diameter $d_2$ of the remainder 2d to define a step S therebetween where the rack bushing is free from contact with the rack shaft 4. The relieved portion 2c extends inwardly of the chamfer 18c of the bushing holder 18 by a distance "x" (see FIG. 1).

When assembling the rack bushing 2 with the bushing holder 18, the slit 2a allows the rack bushing 2 to be compressed to reduce its external diameter so that it may be inserted into the bushing holder 18, and the flange 2b of the rack bushing 2 may be fitted into the annular groove 18a formed in the bushing holder 18 to lock it against withdrawal from the bushing holder 18.

In operation, when steering upon a bad road or the like, a load F (see FIG. 1) may be applied from a steerable wheel to the rack shaft 4 through a tie rod in a direction perpendicular or oblique to the axis of the shaft, in the form of an impact. With the conventional rack bushing 2, the load will act upon the inner peripheral surface thereof at the end 102b located toward the flange 100a, and the surface pressure will be concentrated upon the edge 100c of the chamfer 100b on the bushing holder 100. However, with the rack bushing 2 constructed in accordance with the invention, it is formed with the relieved portion 2c around its inner peripheral surface located toward the flange 2b, and the internal diameter is increased to a point located inward of the chamfer 18c, thus avoiding a contact with the rack shaft 4. In this manner, a concentration of surface pressure upon the edge 18b of the chamfer 18c is prevented, while allowing a substantially even distribution of such surface pressure on a contact surface 19 between the rack bushing 2 and the bush holder 18, thereby effectively preventing any likelihood of damage such as a crack produced in the rack bushing 2.

As discussed above, in accordance with the invention, the inner surface of the rack bushing is formed with a portion which avoids a contact with the rack shaft over an extent which exceeds the region of a groove and a chamfer formed in and on the bush holder which supports the rack bushing, so that if an impact load is applied to the rack shaft, a concentration of surface pressure upon any particular area is avoided, but rather a substantially even distribution thereof is assured, thus eliminating the likelihood of causing a crack in the rack bushing and improving the durability thereof.

While the invention has been described above in connection with a preferred embodiment thereof, it should be understood that a number of changes, modifications and substitutions therein will readily occur to one skilled in the art from the above disclosure without departing from the spirit and scope of the invention defined by the appended claims.

What is claimed is:

1. In a rack and pinion steering system comprising an elongated hollow steering body; a hollow bushing holder fixedly secured within the steering body and having a first interior peripheral surface with an annular radial groove therein, the annular radial groove defining a first sidewall and a second sidewall spaced-apart from the first sidewall in a first direction a distance equal to a width of the annular radial groove; a hollow rack bushing disposed within the bushing holder and having a second interior peripheral surface and an outwardly extending radial flange disposed at one end of the rack bushing, the radial flange having a conforming width so as to fit within the radial groove to restrict relative longitudinal movement between the rack bushing and the bushing holder; and a rack shaft disposed within and being slidably supported by the rack bushing, the improvement wherein a chamfer is formed on the second sidewall of the annular groove, and the rack bushing further includes an increased inner portion extending in the first direction from the radial flange a predetermined distance beyond said chamfer along the second interior peripheral surface of the rack bushing, said increased inner diameter portion avoiding contact with the rack shaft along said predetermined distance.

2. The combination according to claim 1, wherein the rack bushing is formed with an obliquely extending slit for permitting the rack bushing to be compressed form a first external diameter to a second external diameter less than said first external diameter, thus allowing the rack bushing to be inserted into and assembled within the bushing holder.

3. The combination according to claim 1, wherein said rack bushing is formed form a resin material.

* * * * *

UNITED STATES PATENT AND TRADEMARK OFFICE
CERTIFICATE OF CORRECTION

PATENT NO. :  5 271 476

DATED     :  December 21, 1993

INVENTOR(S):  Yukimitsu MINAMIBATA

It is certified that error appears in the above-identified patent and that said Letters Patent is hereby corrected as shown below:

Column 4, line 28; change "form" to ---from---.
         line 34; change "form" to ---from---.

Signed and Sealed this

Twenty-fourth Day of May, 1994

Attest:

BRUCE LEHMAN

*Attesting Officer*       *Commissioner of Patents and Trademarks*